May 27, 1969 H. E. FERREE 3,447,118
STACKING MODULE FOR FLAT PACKAGED ELECTRICAL DEVICES
Filed Aug. 16, 1966
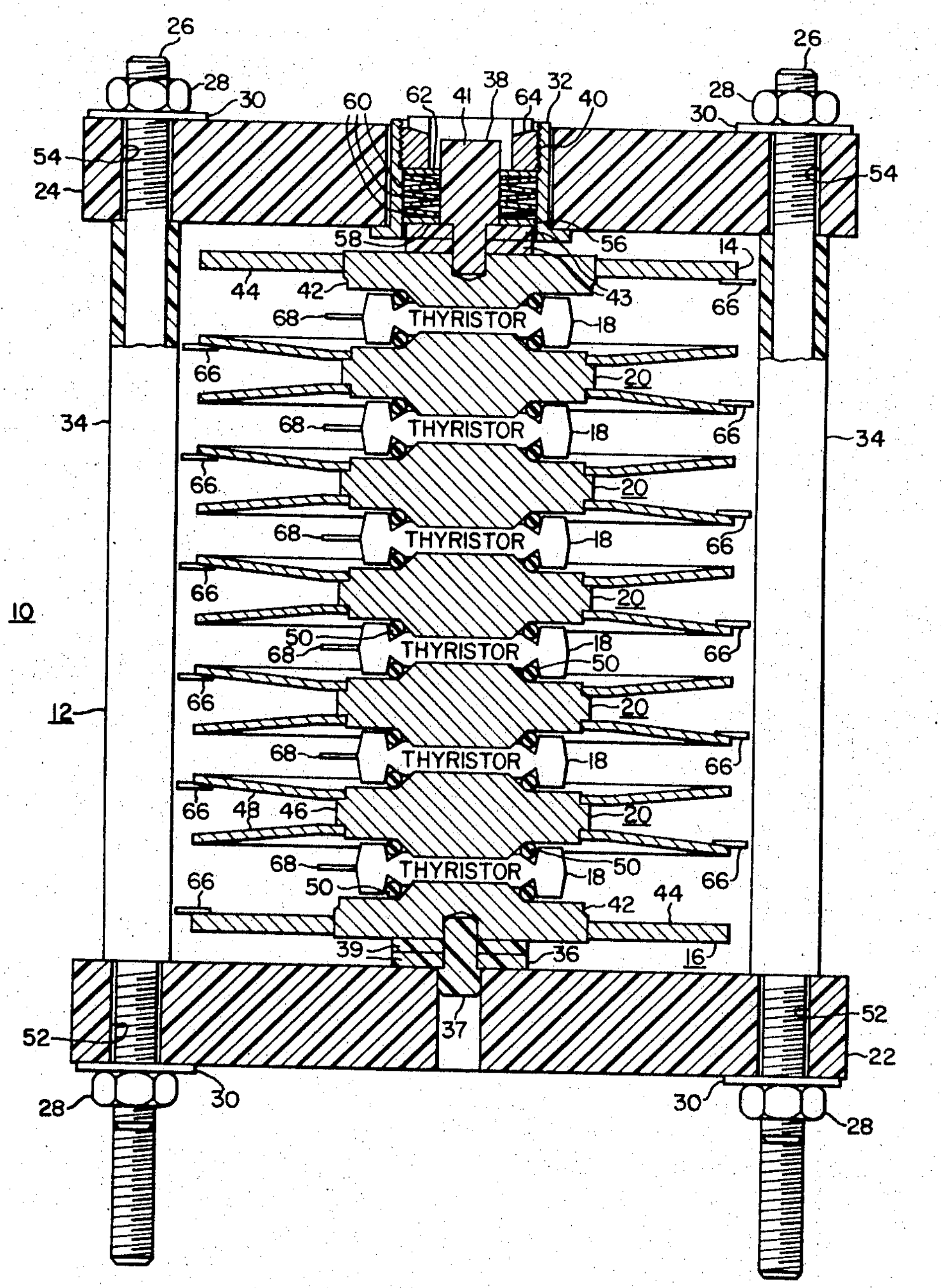
WITNESSES
Theodore F. Wrobel
James T. Young
INVENTOR
Herbert E. Ferree
BY
C. L. Menzemer
ATTORNEY

United States Patent Office 3,447,118

Patented May 27, 1969

3,447,118

STACKING MODULE FOR FLAT PACKAGED ELECTRICAL DEVICES

Herbert E. Ferree, Greensburg, Pa., assignor to Westinghouse Electric Corporation, Pittsburgh, Pa., a corporation of Pennsylvania Filed Aug. 16, 1966, Ser. No. 572,842

Int. Cl. H01c 7/12

U.S. Cl. 338—21 5 Claims

ABSTRACT OF THE DISCLOSURE

A versatile stacking module for flat packaged semiconductor devices which has a readily and accurately adjustable resilient force means to retain the devices and thermally and electrically conductive members in a close conductive relationship with each other. The devices and members are stacked between opposed end brackets spaced apart by hollow spacers. The thermally and electrically conductive members have at least one pedestal portion to engage and centrally locate the adjacent semiconductor device thereon.

This invention relates to a stacking module for flat packaged electrical devices, and more particularly, to a high voltage series stack module employing flat packaged semiconductor thyristors.

An object of this invention is to provide a versatile stacking module for flat packaged electrical devices wherein the force required to hold the electrical devices in good electrical and thermal conductivity relationship with components of the module is readily and accurately adjustable.

Another object of this invention is to provide a versatile stacking module for flat packaged electrical devices wherein the force required to hold the electrical devices in good electrical and thermal conductivity relationship with the components of the module is applied directly to the flat packaged electrical devices.

Other objects of the invention will, in part, be obvious and will, in part, appear hereinafter.

In order to more fully understand the nature and objects of the invention, reference should be had to the following description and the accompanying drawing in the single figure of which there is shown, partly in cross section, a stacking module embodying the teachings of this invention.

In accordance with the present invention and in attainment of the foregoing objects, there is provided a stacking module comprising two opposed end plates, means for maintaining said end plates spaced apart from each other, a plurality of electrical devices disposed between said opposed end plates, a thermally and electrically conductive member disposed between each end plate and an electrical device and between each pair of adjacent electrical devices, means for aligning the electrical devices and the thermally and electrically conductive members within the module between the opposed end plates and with each other, a centrally disposed readily adjustable force means acting directly on the electrical devices and the thermally and electrically conductive members forcing said devices and said members into a thermal and electrical conductive relationship with each other and means for cooling the electrical devices and the thermally and electrically conductive members of the module.

With reference to the figure there is shown a stacking module 10 for flat packaged electrical devices employing the teachings of this invention.

The stacking module 10 comprises a frame assembly 12, two connector end plates 14 and 16, a plurality of flat packaged electrical devices 18 and a plurality of electrically and thermally conductive finned members 20.

The frame assembly 12 comprises two end brackets 22 and 24, of combination tie rod-mounting studs 26, nuts 28, flat washers 30, a threaded spring housing 32 and a plurality of spacers 34.

The purpose of the frame assembly 12 is first, to provide an easy means for the orderly assembling of the necessary components such, for example, as the connector end plates 14 and 16, the electrical devices 18 and the finned members 20. Secondly, the combination tie rod-mounting stud 26 provides an integral means for mounting the stacking module 10 into another electrical assembly. Thirdly, the assembly 12 provides a means for properly locating the components of the stacking module 10. Fourthly, the assembly 12 provides a means for readily applying and adjusting the required force necessary to hold the operating components, the connector end plates 22 and 24, the electrical devices 18 and the finned members 20, in electrical and thermal conductivity relationship with each other as well as applying the force directly to these components.

The end brackets 22 and 24 are made of any suitable material so long as the material will not continually yield, or permanently deform, as a result of the necessary force applied to hold the operating components together. Any yielding of the brackets 22 and 24 during operation of the module 10 may cause a deterioration of the operational efficiency of the module 10 or even a complete breakdown.

Suitable materials to make the brackets 22 and 24 are metals, ceramics and plastics. Electrically insulating materials are particularly suitable for making the brackets 22 and 24. Electrically insulating materials provide an additional protection feature of decreasing the potential failure of the module 10 because of accidental grounding of the operating components.

Electrically insulating materials which are suitable for making the brackets 22 and 24 are for example, glass fiber cloth impregnated with a melamine resin, glass fiber cloth impregnated with an epoxy resin and cotton fiber cloth impregnated with a phenolic resin.

The plate 22 has a centrally disposed locating pin 36. The locating pin 36 positions the end plate 16 within the assembly 12 and therefore positions, or locates, each of the other operating components of the module 10.

The pin 36 may be made of such suitable materials as metals and plastics. Preferably, the pin 36 is made of an electrically insulating material, such for example as polytetrafluoroethylene and trifluoromonochloroethylene. The employment of an electrically insulating material is preferred because it increases the maximum resistance of the operating components of the module 10 to creepage or arcing between components.

The pin 36 may be of one piece construction or it may be an assembly of two or more components. The pin 36 when assembled from two or more components comprises a shaft 37 and one or more apertured washer members 39. The components 37 and 39 are joined together by such suitable means as by gluing or by utilizing a press fit between the components.

The shaft 37 is preferably made of one of the aforementioned electrically insulating materials polytetrafluoroethylene or trifluoromonochloroethylene.

The apertured washer member 39 must be able to withstand compressive loading in the module 10. Therefore, it is preferred that the electrical insulating material comprising the washer 39 be a suitable resin impregnated cloth. Such suitable cloth materials are glass fiber cloth impregnated with a melamine resin, glass fiber cloth impregnated with an epoxy resin and cotton fiber cloth impregnated with a phenolic resin.

The spring housing 32 is centrally disposed in the end bracket 24. The spring housing 32 has several functions. One function is to align a locating pin 38 which in turn properly aligns the end plate 14 and other operating components of the module 10. Another function is to house the means for adjusting the force applied to the operating components of the module 10.

The spring housing 32 is made of any suitable material such, for example, as a ferrous base metal. The housing 32 has internal threading 40 disposed in end portion.

The end bracket 24 is preferably made of the same material which comprises the end bracket 22.

The pin 38 may be of a one piece construction or it may be an assembly of components. Preferably for ease of manufacture and for the best physical properties obtainable, the pin 38 is assembled from components comprising a shaft 41 and one or more apertured members 43.

The materials for making the pin 38 in either manner are exactly the same as those materials employed for making either version of the pin 36.

The locating pin 38 has three functions. First, the pin 38 properly aligns the end plate 14, and therefore the other working components, of the module 10. Second, the pin 38 also aligns the adjustable force means within the housing 32. The third function of the pin 38 is to transmit the applied force from the thrust washer 56 through its one or more apertured washer members 43 to the working components of the module 10 to keep them in good electrical and thermal conductivity relationship with each other.

The end brackets 22 and 24 are joined together by the plurality of combination tie rod-mounting studs 26 and the nuts 28 threaded on each tie rod-mounting stud 26, transmitting their forces to the surfaces of the end brackets 22 and 24 through the flat washers 30 which act as bearing washers.

The tie rod-mounting stud 26 is made of any suitable material which will withstand the forces to be encountered. A suitable material is a ferrous base material. The tie rod-mounting stud 26 may be a threaded rod, a partially threaded rod or a threaded bolt.

The length of the tie rod-mounting stud 26 is determined by the number of operating components to be stacked between the end brackets 22 and 24 and the additional length required to mount the module 10 in appropriate apparatus.

Proper spacing between the end brackets 22 and 24 under load is obtained through the use of the spacers 34. The length of the spacers 34 is also determined by the number of operating components stacked between brackets 22 and 24.

The members 22 and 24 act exactly like a member supported at both ends in a strength of materials problem. During the application of force to the components of the module 10 during its assembling, the member 22 is supported in the center, beneath the pin 36. Consequently neither of the members 22 and 24 are deflected, the forces being applied on opposed surfaces of each of the members 22 and 24 being in equilibrium with each other.

After the required force has been applied, the support for the member 22 is removed. Both members 22 and 24 are deflected thereby causing a relaxation to occur in the springs 60 and relieving part of the force exerted on the devices 18 and the finned members 20. The resulting force which is obtained is the required force necessary for the optimum operation of the stacking module 10.

Each spacer 34 is hollow and encloses the portion of the tie rod-mounting stud 26 within it. Although the spacers 34 could be made of any suitable material, electrically insulating material is preferred. The use of electrically insulating material decreases the possibility of arcing and the occurrence of corona when the module 10 is being operated.

To more particularly describe the invention, and for no other purpose, the module 10 will be described as comprising six (6) flat package thyristors, as the electrical devices 18, employed in a series electrical circuit. The result is a high voltage series stack capable of pulse operation at an impressed voltage of 6000 volts.

During normal operation the devices 18 are operating at a rate of up to approximately 300 pulses per second. Each pulse has a duration of from 10 to 15 microseconds. Consequently, each device 18 is in a blocking condition for a greater percentage of time.

Each device 18 of the module 10 is therefore blocking 1000 volts in its blocking state. Each device 18 also is capable of gating a pulse of current of up to 1000 amperes maximum.

For a complete description of the details concenrning the fabrication of the flat packaged thyristors, reference should be made to a copending U.S. patent application, Ser. No. 555,136, entitled "Flat Packaged Thyristor Assembly" and assigned to the same assignee of this invention.

To assemble the module 10, the end plate 16 is first disposed on the locating pin 36. The end plate 16 is both electrically and thermally conductive. The end plate 16 comprises a heat sink 42 and at least one cooling fin 44.

The heat sink 42 centers the end plate 16 on the locating pin 36 and provides a means for centering, as well as providing a good mounting surface in the form of a pedestal for, the thyristor, or electrical device 18, disposed on it.

The heat sink 42 provides a means for absorbing the heat generated by the operation of the device 18 and dissipating it through its one or more cooling fins 44, the heat being absorbed from the fin, or fins, 44 by a cooling media circulating through and about the working components of the module 10. The heat sink member 42 also conducts electricity to and from the thyristor device 18.

The end plate 16 may be a unitary member formed by casting or forging or it may be made by pressing one, or more, fins 44 onto a heat sink member 42 or it may be fabricated by affixing the one, or more, fins 44 to the heat sink member 42 by such suitable means as welding, brazing, and soldering.

The end plate 16 comprises at least one metal selected from the group consisting of copper, aluminum, silver and base alloys thereof.

An electrical device 18, in this instance a flat packaged thyristor, is then disposed on the heat sink member 42 of the end plate 16. The corresponding shape of both the thyristor 18 and the heat sink member 42 assures a good centering of the thyristor 18 and a good physical mating of their adjoining contacting surfaces.

One of the electrically and thermally conductive finned members 20 is next disposed on the thyristor device 18.

The finned member 20 comprises a heat sink member 46 and one, or more, cooling fins 48. The finned member 20, except for the physical shape of the heat sink member 46 and the thickness of the fin 48, is basically the same as the end plate 16. Additional fins 48 may be affixed to the member 20 as required.

The heat sink member 46 of the member 20 differs from the heat sink member 42 of the end plate 16 in that it has a double pedestal since it is fixtured between two thyristor devices 18. Again the shape of the pedestals of the heat sink member 46 and the adjoining thyristor devices 18 center the components in relation to each other. An O-ring-shaped member 50 may be disposed between the pedestal of each of the heat sink members 42 and 46 and the coresponding portion of the thyristor device 18 adjoining to, and in contact with, the members 42 and 46. The O-ring member 50 has three functions. First, it seals the contacting surfaces of the adjoining pedestal portion of the heat sink members 42 and 44 and the thyristor devices 18 from any corrosive effects the cooling media might have on the components. Second, the member 50 can be used to retain a compound in the void between the components and the member 50 and thereby improve the thermal impedance of the components. Third, it assists in aligning the thyristor device 18 on each pedestal of the heat sink members 42 and 46.

The O-ring member comprises a suitable material which is dependent upon the operating conditions of the module 10. Suitable materials are, such for example, neoprene and an elastomeric silicone.

In a similar manner, by alternating a flat packaged thyristor electrical device 18 with an electrically and thermally conductive finned member 20, another five (5) devices 18 and another four (4) finned members 20, are stacked on top of each other.

The end plate 14 is then disposed on the last of the thyristor devices 18, with, or without the O-ring-shaped member 50 depending upon whether or not they are being used. The end plate 14 is exactly the same as the end plate 16.

It is to be noted that the cooling fin 44, or at least one of them if more than one is used, of the end plates 14 and 16 will usually be thicker than the rest of the fins 48. The reason for this greater thickness is that the end plates 14 and 16 are also the electrodes for the module 10 and must be able to carry the voltages and current impressed upon them to be transmitted through the members 20 and the thyristor devices 18.

The end bracket 24 is then disposed on top of the end plate 14. Spacers 34 are placed between the end brackets 24 and 22. A combination tie rod-mounting stud 26 is slipped through each aperture 52 of the end plate 22, up through each spacer 34, and through each aperture 54 of the end plate 24. Over each end of each tie rod-mounting stud 26 is placed one of the flat washers 30. On each end of each tie rod-mounting stud 26 is disposed one of the nuts 28. Each nut 28 is then drawn up tight until only the spacers 34 keep the end brackets 22 and 24 apart.

The locating pin 38 is then disposed in the spring housing 32, with the projection of the pin 38 inserted into the end plate 14 to properly align it within the frame assembly 12.

A first metal apertured thrust washer 56 is disposed within the spring housing 32, centered about a portion of the alignment pin 38 and disposed on an integral peripheral shoulder 58 of the pin 38. At least one metal apertured convex spring washer 60 is then disposed on the thrust washer 56. A second metal apertured thrust washer 62 is disposed on the last convex spring washer 60.

A predetermined force is applied to the second metal thrust washer 62 to resiliently urge the end plate 14, the alternately stacked electrical devices 18, the alternately stacked finned members 20, and the end plate 16 into an electrical and thermal conductive relationship with each other. When the predetermined force has been applied, an externally threaded thrust nut member 64 is disposed in the spring housing 32, threadedly engaging the internal threading 40 of the housing 32 to retain the applied force on the second thrust washer 62.

An initial force of approximately 800 pounds has been found sufficient to retain the devices 18, the finned members 20 and the plates 14 and 16 of the module 10 in an electrical and thermal contact with each other. This initial force provides sufficient assurance that all components are properly seated. This initial force is sufficient also to allow for any relaxation of the applied force which may occur by subsequent distortion of any of the compounds of the module 10.

To achieve the proper operation of the module 10, however, it is preferred that the impressed voltage during blocking state across each device 18 should essentially be the same. Should the operating voltage across each device 18 vary too greatly from each other it may cause a breakdown of individual devices and possibly a chain reaction resulting in a complete failure of the module 10.

To obtain a uniform voltage drop across each of the devices 18, a balancing circuit is installed across each device 18. The balancing circuit provides a means for diverting a portion of the current which would normally flow across each device 18 to flow through the balancing circuit thereby keeping the voltage across each device 18 during blocking state within desired operation limits.

Because of Ohm's Law, $E=IR$, the voltage impressed across each device 18 is determined by the leakage current flowing through each device 18 during the blocking state. The leakage currents are small, being measured in milliamps, yet the variation between each device 18 may be in the order of 10 times as much current leaking through one device 18 as compared with another device 18, although each device 18 is acceptable for employment in the stacking module 10. Therefore, the voltage impressed across each device 18 during the blocking state will vary inversely in proportion to the leakage current. Consequently, a balancing circuit utilizing suitable resistors is electrically connected across each device 18 in order to provide, as nearly as possible, uniform total leakage currents through each device 18.

Each of the cooling fins 44 and 48 has an electrical terminal 66 affixed to it. The balancing circuit for each device 18 is connected between two of these terminals 66 on adjacent cooling fins 44 or 48 which are on opposite sides of the device 18.

Each device 18 has an integral electrical connector 68. Each connector 68 is in turn connected to an electrical source which produces a periodic electrical pulse. When an electrical pulse is fed into the electrical device 18, the pulse "triggers" the device 18 into permitting the impressed voltage across the device 18 to flow either from the end plate 16 to the finned member 20 to end plate 14, or vice versa, depending on the design of the electrical circuit the module 10 is incorporated in.

One readily appreciates that the components of the module 10 may be electrically rearranged to act in a different electrical capacity. The electrical devices 18 can be electrically insulated from each other and connected into a parallel or series-parallel electrical circuit. These arrangements would provide for variations of a high current module.

The components of the module 10 may be also rearranged electrically to provide a portion of the electrical devices 18 connected in a series electrical circuit and the remainder of the electrical devices 18 connected in a parallel electrical circuit.

The components of the module 10 may also be electrically arranged in a series electrical circuit comprising several parallel electrical circuits comprising two or more electrical devices 18 each.

During operation, the module 10 may be cooled by circulation of a coolant media in and about the cooling fins 44 and 48. Such forms of a coolant media may include air, water, oil, refrigerant gases and the like.

While this invention has been described with reference to particular embodiments and examples, it will be understood of course, that modifications, substitutions and the like may be made therein without departing from its scope.

I claim as my invention:

1. A stacking module comprising (1) two opposed end brackets, (2) means for maintaining said opposed end brackets spaced apart from each other, (3) a plurality of flat packaged semiconductor devices disposed between said opposed end brackets, (4) a thermally and electrically conductive member disposed between each end bracket and a semiconductor device and between each pair of adjacent semiconductor devices, (5) means for aligning the semiconductor devices and the thermally and electrically conductive members within the module, between the opposed end brackets and with each other, said means being comprised in part of at least one pedestal portion of each thermally and electrically conductive member which pedestal portion engages and centers one of said plurality of flat package semiconductor devices, (6) a centrally disposed readily adjustable resilient force means disposed within one of the end brackets and acting directly on the flat package semiconductor devices and the thermally and electrically conductive members forcing said devices and said members into a thermal and electrical conductive relationship with each other, and (7) means for cooling the semiconductor devices and the thermally and electrically conductive members of the module.

2. The stacking module of claim 1 in which the opposed end brackets are each made of a material selected from the group consisting of glass fiber cloth impregnated with a melamine resin, glass fiber cloth impregnated with an epoxy resin and cotton fiber cloth impregnated with a phenolic resin.

3. The stacking module of claim 1 in which the semiconductor devices are connected in a series electrical circuit to form a pulse operated, high voltage series stacking module.

4. The stacking module of claim 1 in which a sealing means is disposed about the outer peripheral edges of an interface formed between a flat packaged semiconductor device and a thermally and electrically conductive member.

5. The stacking module of claim 1 in which:

the semiconductor devices are flat packaged thyristors electrically connected in a series electrical circuit, the opposed end brackets each consisting of a material selected from the group consisting of glass fiber cloth impregnated with a melamine resin, glass fiber cloth impregnated with an epoxy resin, and cotton fiber cloth impregnated with a phenolic resin, the means for maintaining said opposed end brackets spaced apart from each other consisting of a plurality of hollow spacers, the sealing means is disposed about the outer peripheral edges of an interface formed between a flat packaged semiconductor device and a thermally and electrically conductive member, and the semiconductor devices and the thermally and electrically conductive members being cooled by air.

References Cited

UNITED STATES PATENTS

| | | | |
|---|---|---|---|
| 1,063,303 | 6/1913 | Thomson | 338—21 |
| 2,554,278 | 5/1951 | Teszner | 317—61 |
| 2,870,307 | 1/1959 | Milliken et al. | 338—21 |
| 3,096,496 | 7/1963 | Burrage et al. | 338—21 |
| 3,304,529 | 2/1967 | Forwald et al. | 338—21 |

FOREIGN PATENTS

| | | |
|---|---|---|
| 1,124,996 | 7/1956 | France. |

OTHER REFERENCES

Auslegeschrift 1,170,046 Germany.

REUBEN EPSTEIN, *Primary Examiner.*

U.S. Cl. X.R.

317—61, 235; 338—22, 205